US010145432B2

(12) United States Patent
Previtali et al.

(10) Patent No.: US 10,145,432 B2
(45) Date of Patent: Dec. 4, 2018

(54) PAD RETRACTING DEVICE ASSEMBLY FOR BRAKING DISC

(71) Applicant: Freni Brembo S.p.A., Curno, Bergamo (IT)

(72) Inventors: Alberto Previtali, Curno (IT); Aristide Veneziano, Curno (IT)

(73) Assignee: Freni Brembo S.p.A., Curno (IT)

( * ) Notice: Subject to any disclaimer, the term of this patent is extended or adjusted under 35 U.S.C. 154(b) by 20 days.

(21) Appl. No.: 15/326,967

(22) PCT Filed: Jul. 16, 2015

(86) PCT No.: PCT/IB2015/055374
§ 371 (c)(1),
(2) Date: Jan. 17, 2017

(87) PCT Pub. No.: WO2016/009375
PCT Pub. Date: Jan. 21, 2016

(65) Prior Publication Data
US 2017/0204926 A1    Jul. 20, 2017

(30) Foreign Application Priority Data

Jul. 16, 2014   (IT) .............................. BG2014A0026

(51) Int. Cl.
*F16D 65/54*    (2006.01)
*F16D 55/228*   (2006.01)
(Continued)

(52) U.S. Cl.
CPC ........... *F16D 65/54* (2013.01); *F16D 55/228* (2013.01); *F16D 65/097* (2013.01); *F16D 2055/007* (2013.01); *F16D 2127/02* (2013.01)

(58) Field of Classification Search
CPC .. F16D 65/54; F16D 65/097; F16D 2055/007; F16D 2127/02
(Continued)

(56) References Cited

U.S. PATENT DOCUMENTS 3,613,849 A  * 10/1971 Pape ..................... F16D 13/757
                                                      188/196 P
4,345,674 A     8/1982 Vacval
(Continued)

FOREIGN PATENT DOCUMENTS

EP         2 314 895 A1    4/2011

*Primary Examiner* — Melanie Torres Williams
(74) *Attorney, Agent, or Firm* — Blank Rome LLP

(57) ABSTRACT

A disc brake caliper having a caliper body, a disc brake pad with a support plate supporting a friction material, and a pad retracting device. The pad retracting device includes a guide pin which projects from the caliper body and is received in an opening in the support plate, a first carriage portion facing the caliper body, and a second carriage portion facing the friction material and/or said braking disc. A carriage guide is coupled with a predetermined interference between the carriage and the guide pin, allowing the carriage to slide with respect to the guide pin when the predetermined interference is exceeded. An elastic device is arranged between the second carriage portion and the support plate, which forces the support plate to move away from the second carriage portion, which remains integral to the guide pin, and thus from the braking disc by a predetermined extent.

10 Claims, 4 Drawing Sheets

(51) Int. Cl.
    *F16D 65/097*     (2006.01)
    *F16D 55/00*      (2006.01)
    *F16D 127/02*     (2012.01)

(58) Field of Classification Search
    USPC .................................................... 188/71.8
    See application file for complete search history.

(56) References Cited

U.S. PATENT DOCUMENTS

| | | | |
|---|---|---|---|
| 4,436,186 A | * | 3/1984 | Ritsema ............ F16D 55/22655 188/196 P |
| 2007/0227836 A1 | | 10/2007 | Kingston et al. |

\* cited by examiner

PAD RETRACTING DEVICE ASSEMBLY FOR BRAKING DISC

FIELD OF THE INVENTION

The present invention refers to an assembly with retracting device of a pad from a braking disc.

More specifically, the present invention refers to a disc brake caliper assembly comprising a caliper body arranged astride of a brake disc and housing pads that, when biased by thrust means housed in the caliper body, abut against opposite braking surfaces of the braking disc, exerting a braking action.

As known, once the braking action of a vehicle has ended, the braking system stops generating a thrust through the thrust device, usually a piston housed in a cylinder foreseen in a caliper body fixed to a suspension and arranged astride of a braking disc fixed to a rotating wheel hub. Once the thrust ends the pad does not necessarily move away from the braking surface of the disc and, also due to the rotation of the disc and to constructive tolerances, as well as deformations generated by the use of the brake, the pad continues to graze such a braking surface generating a residual braking torque that results in noise, undesired consumption of fuel, reduction of performance and other drawbacks.

STATE OF THE ART

In order to avoid this problem, it is known to introduce a slight roll-back in the piston, for example thanks to the elastic recovery of some gaskets foreseen between piston and cylinder, as well as it being known to arrange a spring that constantly biases the pads away from the braking disc so as to avoid accidental contacts and the generation of a residual braking torque.

However, these known springs have an unsolvable drawback. As the wearing of the friction material of the pad increases, the stress exerted by the spring increases and consequently the load exerted on the pistons increases, resulting in the risk that by thrusting on the pads, the spring can also roll-back the pistons, creating an undesired stroke of the pistons to realign the pads against the braking surfaces of the disc upon the command of the user who perceives this excessive stroke as a delay or an undesired unresponsiveness of the braking system.

Therefore, there is a great need for a device that allows the pads to retract by a predetermined amount with respect to the braking surfaces of the braking disc once the commanded braking action ends.

At the same time, there is a contrasting great need to keep the pad still (within certain limits) in its seat to ensure that the thrusting action of the pistons always occurs in an area of the pads and above all of the braking surfaces that are predetermined and optimal for braking.

In order to adequately understand the problem, it must be considered how the desired retraction of the pad from the braking surface must be minimal, since it is at the same time necessary to satisfy the requirements of keeping the pad as close as possible to the disc and prevent the user of the vehicle, sometimes a racing driver using the vehicle in competitions, from feeling that the brake is too soft or spongy, since before exerting the necessary thrust with the piston on the pad and abut it on the braking surface, it becomes necessary to recover the clearance of the pad and the roll-back of the piston created to avoid the residual torque.

Therefore, there is a great need both to retract the pad from the braking disc at the end of the braking action, but also the contrasting need to avoid moving it away excessively, making the braking action of the brake not very reactive to the command of the user.

In order to try to solve these contrasting requirements, increasingly accurate roll-back systems, as well as systems for retracting the pad from the braking disc, have been proposed, so that it follows the retraction of the piston at the end of the braking action.

Solutions of this type are known in brakes equipped with a floating body, like for example in U.S. Pat. Nos. 2,551,252, 3,618,714, 3,500,966, 2,830,680, 2,948,356, 3,613,849, 4,345,674 and in calipers with fixed body like for example in EP2314895.

However, these known solutions do not in any way solve the numerous problems generated by the need to have an assembly that is simple to construct and easy to maintain, but above all suitable for being used on known caliper bodies, of earlier design, so as to also apply the invention to existing brakes, maintaining simplicity of construction and application and the precision of certain retraction of the pad with respect to the braking disc once the braking action has ended without influencing the piston and its roll-back devices, particularly for brakes of substantial applications like brakes for sports applications, for example for fixed brake calipers with pistons arranged on both sides of the braking disc.

SOLUTION

Therefore, the purpose of the present invention is to propose an assembly, which allows the aforementioned requirements to be achieved, as well as allowing the drawbacks of the aforementioned state of the art to be overcome.

These and other purposes are achieved by an assembly according to claim 1, as well as by a method according to claim 9. Some advantageous embodiments are the object of the dependent claims.

FIGURES

Further characteristics and advantages of the assembly according to the invention will become clearer from the following description of preferred embodiments thereof, given for indicating and not limiting purposes, with reference to the attached figures, in which.

DESCRIPTION OF SOME PREFERRED EMBODIMENTS

Figure 1:
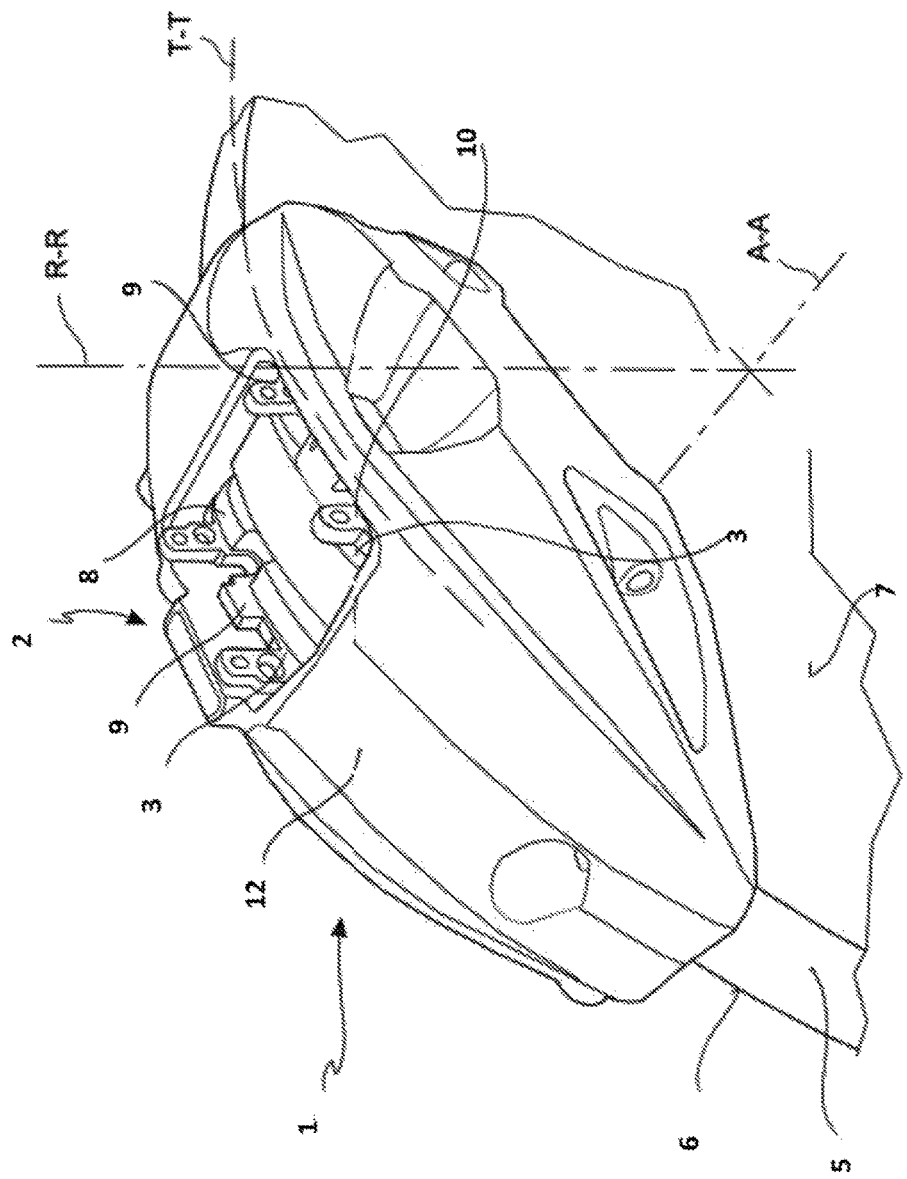
FIG. 1 represents a perspective view of a caliper assembly for a disc brake arranged astride of a braking disc.
Figure 2:
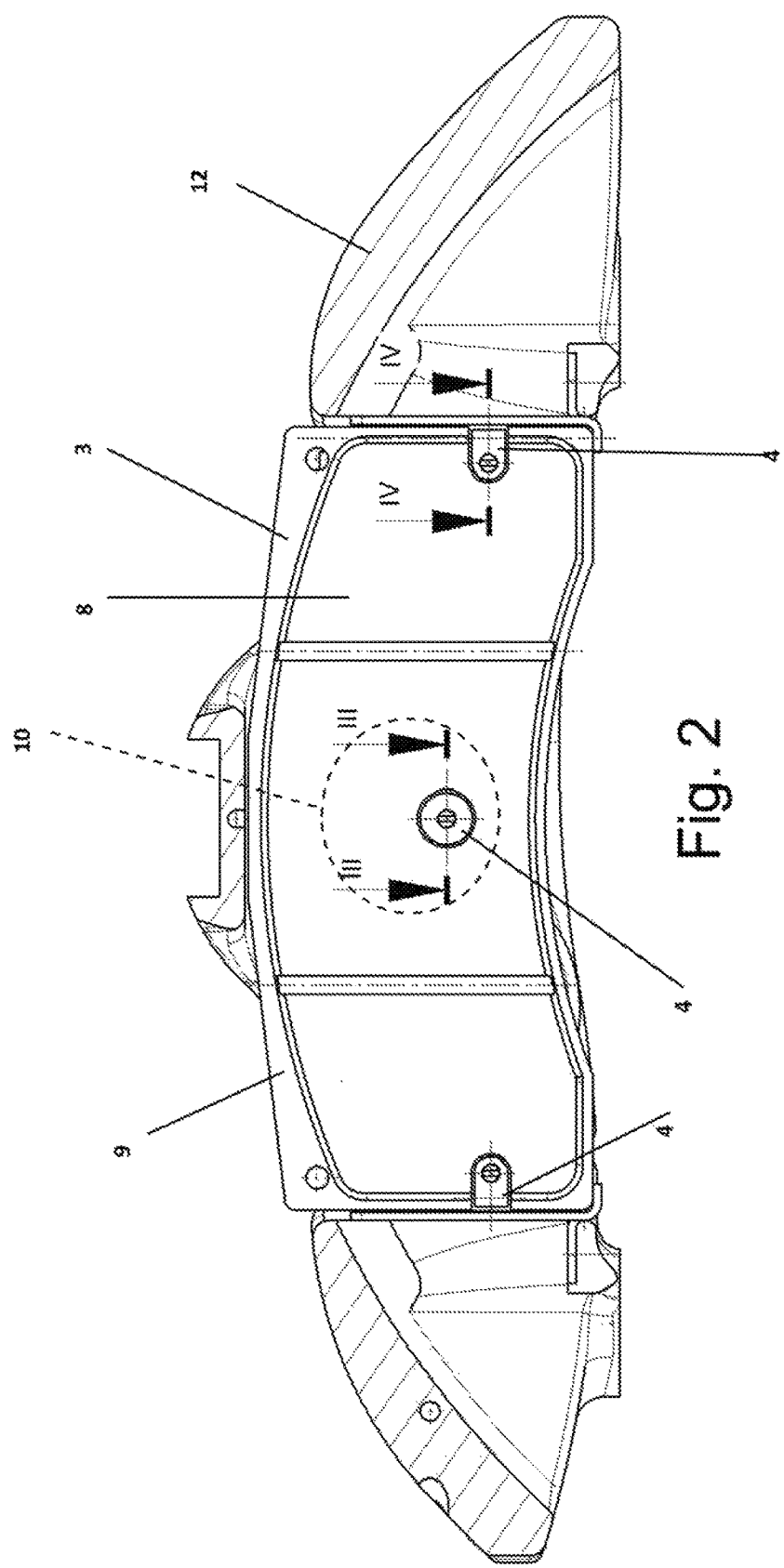
FIG. 2 illustrates a tangential section of a disc brake caliper according to a further embodiment, in which two devices for retracting, or distancing, the brake pad from the braking disc according to two different embodiments are highlighted.
Figure 3:
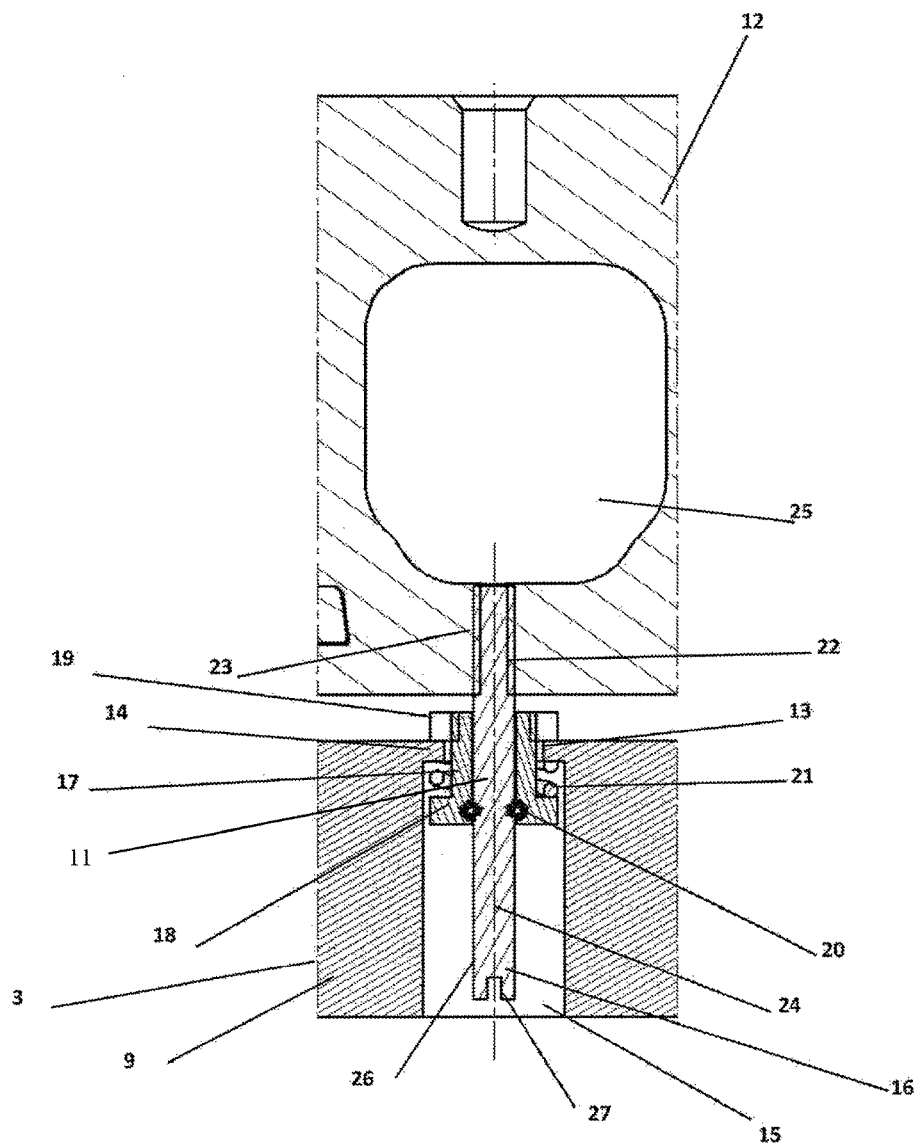
FIG. 3 represents a section III-Ill of FIG. 2 of a detail of the pad retracting device from the braking disc according to a first embodiment.
Figure 4:
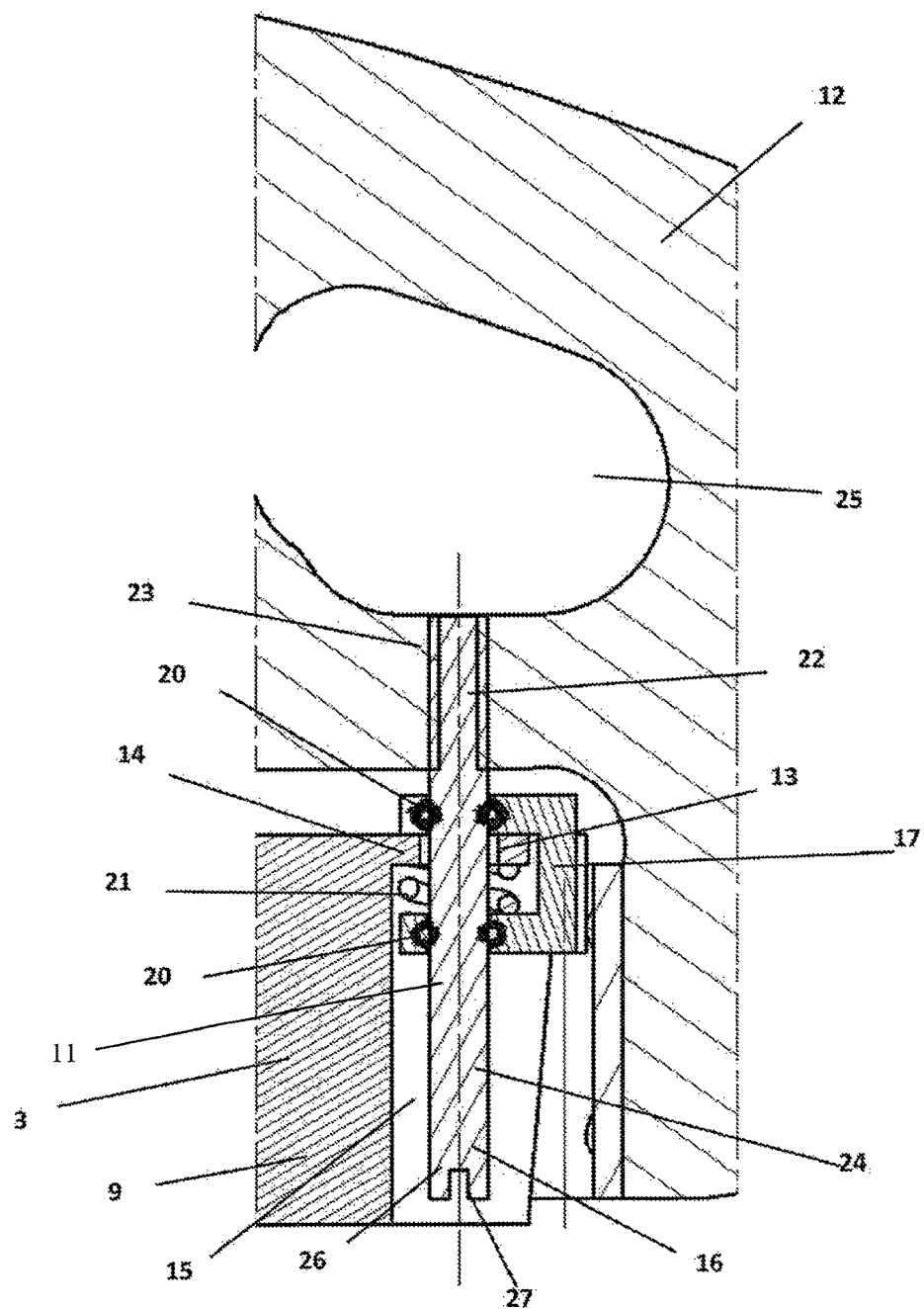
FIG. 4 represents a section IV-IV of FIG. 2 of a detail of the pad retracting device from the braking disc according to a second embodiment.

With reference to the aforementioned figures and in accordance with a general embodiment, an assembly 1 comprises a disc brake caliper 2, having a caliper body 12, a disc brake pad 3 and at least one pad retracting device from a braking disc 5 suitable for retracting said pad from one of opposite braking surfaces 6, 7 of said braking disc 5.

Said pad 2 comprises:
a friction material 8 suitable to abut against said braking surface 6 or 7 and to exert a braking action;
a support plate 9 suitable to support said friction material 8 and to receive a thrust from at least one thrust device 10 received in said disc brake caliper body 12.

Said support plate 9 comprises a plate portion 14 that delimits a plate opening 13 facing said caliper body 12 and that allows access to a plate seat 15 formed at least partially in said support plate 9.

Said pad retracting device 4 is separated from each thrusting device 10 so as to avoid interfering with said roll-back device at all times.

Said pad retracting device 4 comprises:
at least one guide pin 11 integrally secured to said caliper body 12;
said guide pin 11 projects in a cantilevered manner from said caliper body 12 and it is received in said plate opening 13 and with its pin end portion 16 in said plate seat 15.

Advantageously, said pad retracting device 4 comprises a carriage 17 arranged astride of said plate portion 14 having a first carriage portion 18 facing towards the caliper body 12 with respect to said plate portion 14 and a second carriage portion 19 facing towards said friction material 8 and/or facing said braking disc 5.

Said pad retracting device 4 also comprises a carriage guide 20 coupled with predetermined interference between said carriage 17 and said guide pin 11 allowing a sliding of said carriage 17 with respect to said guide pin 11 once the action determined by said predetermined interference has passed.

Said pad retracting device 4 also comprises an elastic device 21 arranged between said second carriage portion 19 and said plate portion 14.

Said elastic device 21 has an elastic characteristic capable of an elastic action of smaller extent with respect to said action determined by said predetermined interference determined by said carriage guide 20 with said pin guide 11, so as to influence said support plate 9 moving away from said second carriage portion 19, which stays integral with said guide pin 11 and thus from said braking disc 5 by a predetermined amount.

In accordance with an embodiment, said guide pin 11 comprises a threaded pin portion 22 screwed firmly into a threaded hole 23 foreseen in the caliper body 12.

In accordance with an embodiment, said threaded hole 23 is a through hole that places a surface of the caliper body 12 facing the pad 3 in communication with a lightening chamber or compartment 25 foreseen in the caliper body.

In accordance with an embodiment, said guide pin 11 comprises a guide stem 24 that projects cantilevered from said caliper body in a direction parallel to the sliding direction of the pad 3 towards and away from the braking disc 5, providing a support that is integral to the caliper body for said carriage 17 anchored through the predetermined interference of said carriage guide 20 to the stem in the absence of a greater thrusting action of the thrust device 10 at the end of the braking action.

In accordance with an embodiment, said guide stem 24 comprises a free end portion 26 comprising coupling means for maneuver means 27 for example a key for a screwdriver or screwing tool.

In accordance with an embodiment, said plate portion 14 is a central portion with respect to the body of the support plate 9 and forms a closed plate opening edge 14 forming an annular undercut surface fully surrounding said plate opening 13, with respect to the caliper body, for supporting the elastic device 21.

In accordance with an embodiment, said plate portion 14 is a side or edge portion with respect to the body of the support plate 9 and forms an open plate opening edge 14 forming an undercut surface that avoids fully surrounding said plate opening 14, with respect to the caliper body, for supporting the elastic device 21.

In accordance with an embodiment, said plate seat 15 forms a compartment that fully surrounds said pin end portion 16 and said carriage 17, avoiding said second carriage portion 19 directly interfering with said plate 9 or said friction material 8 and preventing them from sliding with respect to the carriage 17 during the initial steps of braking while the pad 3 abuts against the friction surface 6 or 7.

In accordance with an embodiment, said plate seat 15 forms a compartment that prevents from fully surrounding said pin end portion 16 and said carriage 17, avoiding said second carriage portion 19 directly interfering with said plate 9 or said friction material 8 and preventing them from sliding with respect to the carriage 17 during the initial steps of braking while the pad 3 abuts against the friction surface 6 or 7.

In accordance with an embodiment, said carriage 17 has a carriage body in a single piece or in fixedly connected parts so as to avoid the mutual separation and it is arranged astride of the plate portion 14 that delimits said opening 13.

In accordance with an embodiment, said carriage 17 has a C-shaped carriage body with said first and said second carriage portion 18 and 19 connected by a side bridge.

In accordance with an embodiment, said first and second carriage portion 18 and 19 have a through hole suitable for receiving a portion of said guide pin 11.

In accordance with an embodiment, said carriage 17 has a carriage body in at least two pieces or in separate parts and connected together to go astride of the plate portion 14 that delimits said opening 13 passing with a central portion in said opening 13.

In accordance with an embodiment, said carriage 17 has a tubular carriage body with said first and second carriage portion 18 and 19 connected by a tubular central bridge suitable for receiving a portion of said guide pin 11.

In accordance with an embodiment, said elastic device 21 is fitted onto said tubular central bridge.

In accordance with an embodiment, said second carriage portion is integral with said central bridge that ends with a threaded portion and connected to said first carriage portion 18 screwed with a threaded through hole thereof to said threaded tubular central bridge.

In accordance with an embodiment, said plate portion 14 is a central portion with respect to the body of the support plate 9 and forms a closed plate opening edge 14 forming an annular undercut surface fully surrounding said plate opening 13, with respect to the caliper body, for supporting the elastic device 21.

In accordance with an embodiment, said carriage guide 20 comprises at least one O-ring.

In accordance with an embodiment, said elastic device 21 comprises a spring, for example a helical spring, fitted onto said guide pin 11.

In accordance with an embodiment, said elastic device 21 comprises a spring, for example a cup spring or a conical spring or conical washer, fitted onto said guide pin 11.

In accordance with an embodiment, said elastic device 21 comprises a spring, for example a spring made of elastomeric material, fitted onto said guide pin 11.

In accordance with an embodiment, said caliper is a caliper in a fixed caliper body comprising at least one thrust device 10 in each of the opposite sides thereof facing the opposite braking surfaces 6, 7 when the caliper is arranged astride of the braking disc 5.

In accordance with an embodiment, at least two separate pad retracting devices 4 are foreseen arranged at least one for each of the opposite pads 3.

Hereafter, a possible operating method of an assembly according to the invention will be described.

A method for moving a disc brake pad away from a disc brake disc comprises the steps of:
  providing an assembly as defined in any of the embodiments described above;
  sliding the carriage 17 during the braking action when the thrust action of the thrust device 10 exceeds the elastic action of the elastic device 21, thus packing said elastic device, and when the thrust action of the thrust device 10 exceeds the interference action exerted by the carriage guide 20 onto the guide pin 11;
  retracting said pad 3 when of the thrust action of the thrust device 10 ends, by a predetermined extent or stroke, by virtue of the elastic action of the elastic device 21.

In accordance with an embodiment of the method the following further step is foreseen:
  retracting each pad independently from the other pads.

In accordance with an embodiment of the method the following further step is foreseen:
  retracting each pad 3 thanks to an elastic action provided to the pad thanks to the reaction of a carriage 17 temporarily fixed together with a guide pin 11 integral with the caliper 2.

In accordance with an embodiment of the method the following further step is also foreseen:
  said elastic action of the elastic device 21 is of predetermined extent smaller than the interference action exerted by the carriage guide 20 onto the guide pin 11.

Thanks to the characteristics described above, foreseen separately from each other or in combination in particular embodiments, it is possible to obtain an assembly that at the same time satisfies the aforementioned contrasting requirements, and in particular:
  it solves the strong requirement to find an assembly that allows the pad to be moved away from the braking surface to avoid the formation of residual torques at the end of the braking action itself;
  it avoids generating a residual braking torque that results in noise, undesired fuel consumption, reduction of performance and other drawbacks;
  it avoids retracting the piston excessively, biasing it with the pad retracting into its seat of the caliper body;
  the pad is moved away from the braking disc by a predetermined and always equal amount irrespective of the extent of wearing of the friction material;
  therefore at the same time it satisfies the need to keep the pad as close as possible to the disc and avoid the user of the vehicle feeling that the brake is too soft or spongy, avoiding an excessive clearance, created to avoid residual torque, needing to be recovered before exerting the necessary thrust with the piston on the pad and abut it on the braking surface;
  it is possible both to move the pad away from the braking disc at the end of the braking action, as well as meeting the contrasting need to avoid moving it too far away, making the braking action of the brake not very reactive to the user's command;
  the pad is allowed to remain guided by the caliper body in a precise manner;
  the roll-back action of the piston and the retracting action of the pad are kept separate.

Those skilled in the art can bring numerous modifications and variants to the assembly according to the invention, in order to satisfy contingent and specific requirements, all of which are covered by the scope of protection of the invention, as defined by the following claims.

REFERENCES 1. assembly
2. disc brake caliper
3. disc brake pad
4. pad retracting device
5. braking disc
6. opposite braking surfaces
7. opposite braking surfaces
8. friction material
9. support plate
10. thrust device
11. guide pin
12. caliper body
13. plate opening
14. plate portion
15. plate seat
16. pin end portion
17. carriage
18. first carriage portion
19. second carriage portion
20. carriage guide
21. elastic device
22. threaded pin portion
23. threaded hole
24. guide stem
25. lightening compartment
26. free end portion
27. coupling means for maneuver means
T-T tangential or pad sliding direction
R-R direction perpendicular to T-T or radial direction
A_A axial direction or direction perpendicular to the thrust direction

The invention claimed is:

1. An assembly of disc brake caliper having a caliper body, a disc brake pad, and at least one pad retracting device from a braking disc suitable to retract said pad from one of opposite braking surfaces of said braking disc;
  said pad comprising:
    a friction material suitable to abut against said braking surface and to exert a braking action;
    a support plate suitable to support said friction material and to receive a thrust from at least one thrust device received in said disc brake caliper body;
    said support plate comprising a plate portion defining a plate opening facing said caliper body and which allows accessing a plate seat at least partially obtained in said support plate;
  wherein
    said pad retracting device is separated from each thrust device;
    said pad retracting device comprises:

at least one guide pin integrally secured to said caliper body;

said guide pin projects in a cantilevered manner from said caliper body and it is received in said plate opening, and with its pin end portion in said plate seat; wherein said pad retracting device comprises a carriage arranged astride of said plate portion, having a first carriage portion facing the caliper body with respect to said plate portion, and a second carriage portion facing said friction material and/or said braking disc;

said pad retracting device further comprises a carriage guide coupled with a predetermined interference between said carriage and said guide pin, allowing said carriage sliding with respect to said guide pin when the action determined by said predetermined interference is exceeded; said pad retracting device further comprises an elastic device arranged between said second carriage portion and said plate portion;

said elastic device having an elastic characteristic capable of an elastic action of a lesser extent than said action determined by said predetermined interference determined by said carriage guide with said guide pin, so as to force said support plate to move away from said second carriage portion, which remains integral to said guide pin, and thus from said braking disc by a predetermined extent.

2. The assembly according to claim 1, wherein said guide pin comprises a threaded pin portion firmly screwed in a threaded hole provided for in the caliper body; and/or wherein said threaded hole is a through hole that puts a surface of the caliper body facing the pad in communication with a lightening chamber or compartment provided for in the caliper body; and/or wherein said guide pin comprises a guide stem cantilever projecting from said caliper body in a direction parallel to the sliding direction of the pad approaching and moving away from the braking disc, providing a support that is integral to the caliper body for said carriage anchored via the predetermined interference of said carriage guide to the stem in the absence of a greater thrust action of the thrust device at the end of the braking action; and/or wherein said guide stem comprises a free end portion comprising coupling means for maneuver means; and/or wherein said elastic action of the elastic device has a predetermined extent that is less than the interference action exerted by the carriage guide onto the guide pin.

3. The assembly according to claim 1, wherein said plate portion is a portion that is centrally arranged to the body of the support plate and forms a closed edge of plate opening forming an annular undercut surface fully surrounding said plate opening, with respect to the caliper body, for supporting the elastic device; and/ or wherein said plate portion is a side or edge portion with respect to the body of the support plate, and forms an open edge of plate opening forming an undercut surface that avoids to fully surround said plate opening, with respect to the caliper body, for supporting the elastic device; and/or wherein said plate seat forms a compartment fully surrounding said pin end portion and said carriage, preventing said second carriage portion from directly interfering with said plate or said friction material, and that these may slide with respect to the carriage during the initial braking steps while the pad abuts against the friction surface; and/or wherein said plate seat forms a compartment that avoids fully surrounding said pin end portion and said carriage, preventing said second carriage portion from directly interfering with said plate or said friction material and that these may slide with respect to the during the initial braking steps while the pad abuts against the friction surface.

4. The assembly according to claim 1, wherein said carriage has a carriage body in a single piece or in parts that are made integral to one another, so as to prevent the mutual separation, and it is arranged astride of the plate portion defining said opening; and/or wherein said carriage has a "C"-shaped carriage body with said first and second carriage portions connected by a side bridge; and/or wherein said first and second carriage portions have a through hole that is suitable to receive a portion of said guide pin; and/or wherein said carriage has a carriage body in at least two pieces or in parts that are separates and mutually connected in order to arrange astride of the plate portion defining said opening passing with a central portion in said opening; and/or wherein said carriage has a tubular carriage body with said first and second carriage portions connected by a tubular central bridge that is suitable to receive a portion of said guide pin; and/or wherein said elastic device is fitted on said tubular central bridge; and/or wherein said second carriage portion is integral to said central bridge, ending with a portion that is threaded and connected to said first carriage portion, which is screwed with a threaded through hole thereof to said threaded tubular central bridge.

5. The assembly according to claim 1, wherein said carriage guide comprises an elastic ring received in a seat provided for in said carriage and fitted on said guide pin with a predetermined interference so as to slide onto said guide pin only when a predetermined thrust action exerted onto the carriage by packing said elastic device is exceeded; and/or wherein said carriage guide comprises at least one O-Ring.

6. The assembly according to claim 1, wherein said elastic device comprises a spring, for example a helicoidal spring, fitted on said guide pin; and/or wherein said elastic device comprises a spring, for example a cup- or conical ring- or conical bushing-shaped spring, fitted on said guide pin; and/or wherein said elastic device comprises a spring fitted on said guide pin.

7. The assembly according to claim 1, wherein said caliper is a caliper with a stationary caliper body comprising at least one thrust device in each of the opposite sides thereof that are arranged facing the opposite braking surfaces when the caliper is arranged astride of the braking disc.

8. The assembly according to claim 1, wherein at least two discrete pad retracting devices are provided for, which are arranged at least one for each of the opposite pads.

9. A method for moving a disc brake pad away from a disc brake disc, comprising the steps of:

providing an assembly as defined in claim 1;

sliding the carriage during the braking action when the thrust of the thrust device exceeds the elastic action of the elastic device, thus packing said elastic device, and when the thrust of the thrust device exceeds the interference exerted by the carriage guide onto the guide pin;

retracting said pad when the thrust ends, by a predetermined extent or stroke, by virtue of the elastic action of the elastic device.

10. The method according to claim 8, wherein each pad is retracted independently of the other pads.

* * * * *